Patented June 30, 1953

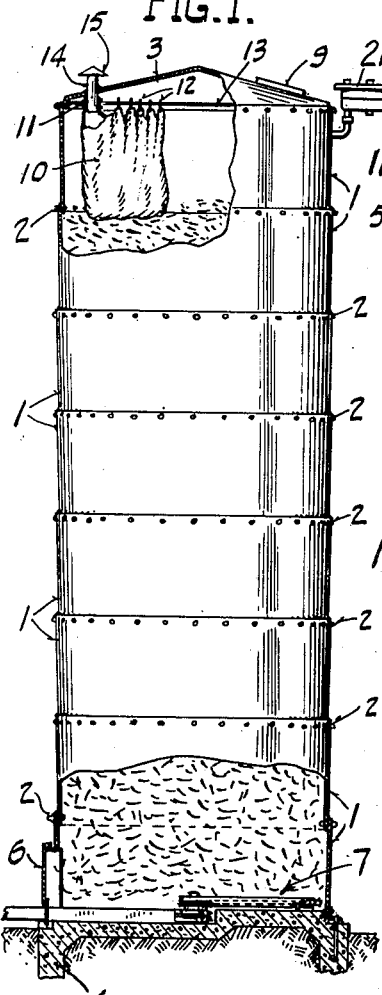
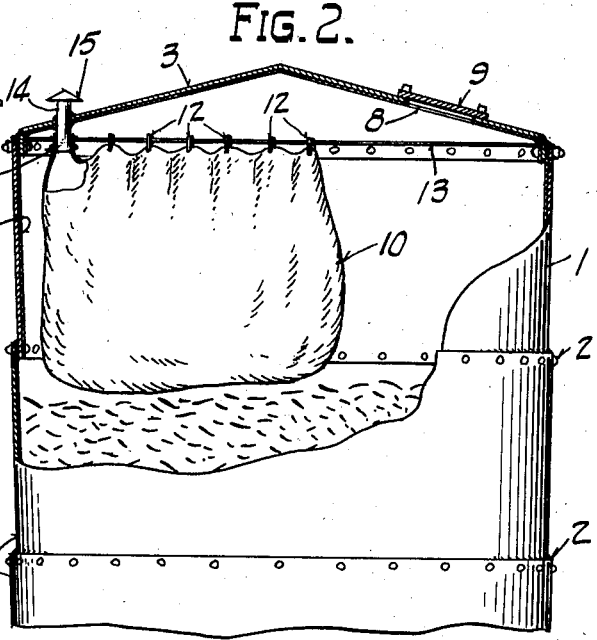
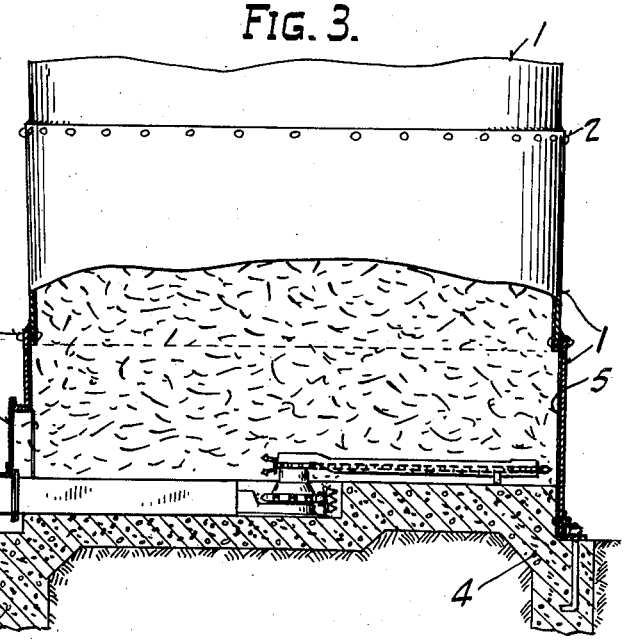
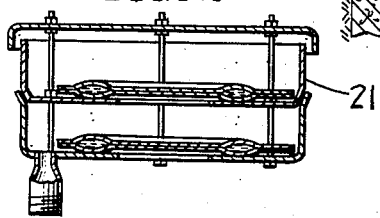

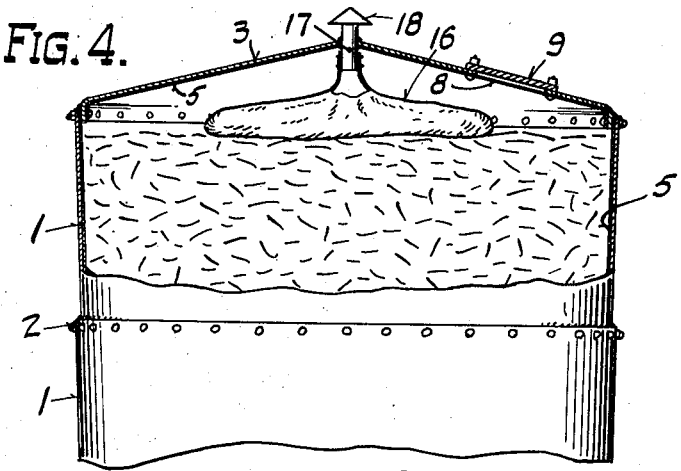
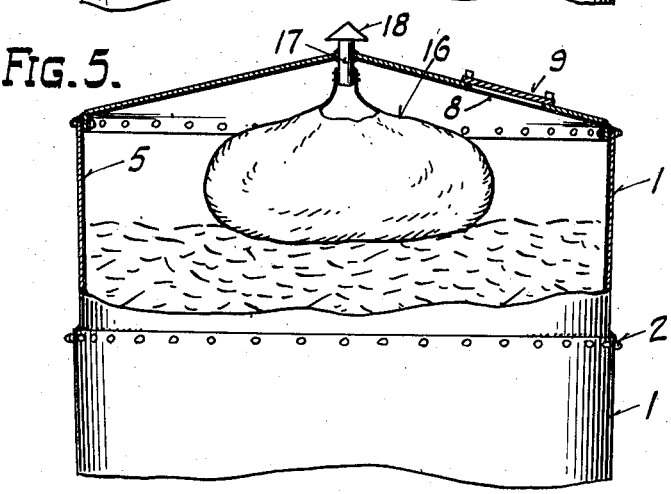
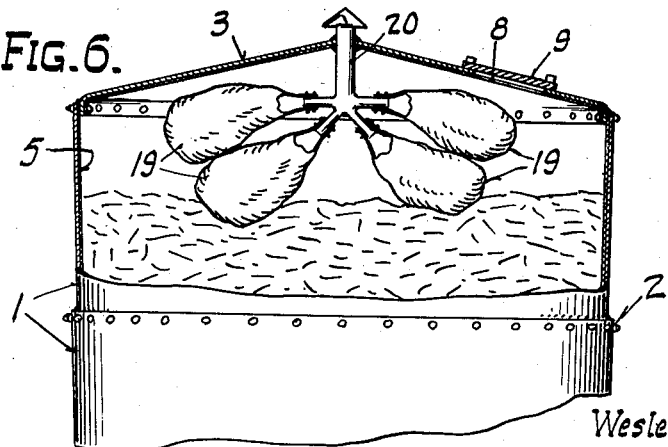

2,643,602

UNITED STATES PATENT OFFICE 2,643,602

PRESSURE PROTECTED SILOLIKE CONTAINER FOR PRESERVING FARM CROPS

Wesley G. Martin, Milwaukee, Wis., assignor to A. O. Smith Corporation, Milwaukee, Wis., a corporation of New York Application July 2, 1949, Serial No. 102,814

1 Claim. (Cl. 99—235)

This invention relates to an improved storage structure, for storing farm crops and products for both animal and human consumption, and particularly to a flexible member assembled with the structure which can vary its volume in order to maintain substantially atmospheric pressure within the structure at all times. The invention is described and illustrated as applied to a metal silo of a substantially airtight construction in which forage crops for animals are stored and transformed into silage.

Repeated observation has disclosed that in a storage structure like a silo considerable change of temperature occurs between daytime and nighttime. Likewise it has been found that changes of temperature occur according to different seasons of the year. These temperature changes result in changes in pressure of the atmosphere inside the structure and particularly in those structures of airtight construction. Pressure changes also occur with barometric changes. A storage structure of the type above referred to has been said to breathe because of changes of pressure therein. Under certain conditions air tends to flow into the structure because of a decrease of pressure inside the same as compared to the pressure of the atmosphere outside. Under other conditions where the pressure within the silo is greater than that of the atmosphere outside, gases will tend to flow out of the structure until such time as the pressure within the structure and that of the atmosphere is equalized.

When green crops have been placed in a silo, the plant cells continue to respire and produce an appreciable amount of gases including large quantities of carbon dioxide. If an appropriate amount of the carbon dioxide gas can be retained within the silo, or restrained in some manner from escaping therefrom so that air is excluded from within the silo, the process of fermentation will continue without spoilage of the silage. On the other hand, if, because of changes of pressure within the storage structure, the carbon dioxide gas is lost and later, any substantial amount of air enters the silo to replace the lost gas and mix with the gases of fermentation, the free oxygen will tend to promote mold growth in the silage exposed to the oxygen leading to deterioration.

After the initial phase of fermentation is completed when great amounts of gases are given off by the stored crops fermentation may continue for an appreciable time, but at a much slower rate. If the air entering the silo is limited to small amounts which will be absorbed by the silage so that oxidation of the silage is arrested, then mold growth will be substantially prevented and the silage will remain well preserved.

An object of the invention is to provide a storage structure for farm crops which incorporates a device which will permit the structure to inhale and exhale and at the same time prevent deterioration of the crops stored therein.

Another object is to provide a storage structure in which the internal pressure of the structure is maintained at substantially atmospheric at all times.

Another object is to provide a storage structure in which mold growth of the silage stored therein is substantially prevented.

A further object is to provide a storage structure in which provision is made for the storage structure to inhale and exhale without any substantial change in internal pressure from atmospheric.

Another object is to provide a storage structure in which provision is made to prevent mixture of air with the gases inside the structure.

Another object is to provide a storage structure in which provision is made to compensate for changes of pressure within the structure caused by changes of barometric pressure and temperature.

Another object is to provide means of safeguarding the structure against sudden changes in pressure between the inside and outside.

Another object is to provide a structure in which provision is made to unload the material stored therein from the bottom so as to hold the entry of air to a minimum during unloading.

Another object is to limit the entry of oxygen into a crop storage structure to such small amounts, when the structure is in use, that the stored crop is more perfectly preserved.

Other objects and advantages of the invention will appear hereinafter.

The invention is illustrated in the accompanying drawings in which:

Figure 1 is an elevational view of a silo illustrating the invention with parts broken away, and sectioned, and showing a flexible member in a deflated position;

Fig. 2 is an enlarged view, partly in section, of the upper portion of the silo showing a flexible member in a partially inflated position;

Fig. 3 is an enlarged elevational view, partly in section, of the bottom of the silo;

Fig. 4 is a view similar to Fig. 2 showing a modified flexible member in deflated position;

Fig. 5 is a view similar to Fig. 4 showing the modified flexible member in a partially inflated position;

Fig. 6 is an enlarged view, partly in section of the upper portion of a silo showing a plurality of flexible members partially inflated; and Fig. 7 is a transverse vertical central section of the relief valve.

The invention which is directed to the problem of the storage of materials in a substantially airtight storage structure is illustrated by application to the silo shown in the drawings and which is similar to that disclosed and claimed in the application of the present inventor entitled "Silo," Serial No. 598,044, filed June 7, 1945 now Patent No. 2,551,216 assigned to the assignee of the present invention. The present invention utilizes the principles of preservation of silage set forth in Patent No. 2,551,217, issued to the present inventor upon an application Serial No. 662,854, filed April 17, 1946.

The silo comprises a plurality of cylindrical sections 1 which are disposed one on top of the other and secured together at joints 2. A cover 3 encloses the top of the silo. The base of the silo is secured to a foundation 4 of cement or the like, which extends a substantial depth beneath the silo proper to securely anchor the same.

The several sections 1 are of suitable gauge metal, and the sections and cover 3 are preferably coated with a ceramic enamel coating 5 to protect the metal from corrosion. The joints 2 are sealed with a suitable sealing material to prevent leakage of air, water or the like therethrough.

An opening is provided in the bottom section 1 which is closed by an air-tight door 6. This opening provides access to the interior of the silo.

The silage is removed from the bottom of the silo by a mechanical unloader 7, shown schematically and so constructed as to prevent any substantial flow of air therethrough into the silo. The unloader may correspond to that disclosed in the copending application of Julius Tiedemann, Serial No. 98,794 entitled, Method of Unloading Stored Material and Apparatus Therefor and issued to Patent No. 2,635,770.

An opening 8 is located within the cover 3 to provide access to the interior of the silo, for insertion of a filler pipe therein not shown, as of a corn shredder machine to fill the silo with forage crops. The opening is closed by an airtight door 9 when not in use.

In carrying out the invention the silo is provided with a flexible member or expansion chamber 10 located near the top of the silo and illustrated in the drawing as a bag of a cloth impregnated with rubber or flexible resin to prevent passage of air therethrough. Bag member 10 also may be fabricated from any one of a number of impervious flexible plastic materials. The bag 10 is preferably of a rectangular or circular shape and is closed to the inside of the silo so that passage of air into or out of the bag occurs only through the neck 11.

Expansion chamber 10 is of a substantially large size. For a modern silo fourteen feet in diameter, forty feet deep, and with a capacity of approximately six thousand cubic feet, it is preferred to use a bag or expansion chamber approximately eight feet in diameter, fourteen feet long, and having a capacity of approximately six hundred cubic feet.

Fig. 2 illustrates a rectangular shaped bag serving as the expansion chamber 10. In this embodiment of the invention the upper edge of the expansion chamber or bag 10 is provided with grommets or clips 12 so that the bag may be suspended from a suitable support 13 comprising a wire or metal rod which extends across the inside of the silo near the top. The ends of support 13 are secured in any suitable manner to the opposite corresponding sides of the inner wall of the silo.

One end of a breather pipe 14 is connected to a small diameter opening 11 of expansion chamber 10 and the pipe extends upwardly through cover 3 to the atmosphere outside the silo. An airtight joint is provided between pipe 14 and cover 3. The outer end of pipe 14 may be provided with a weather-proof vent 15.

The breather pipe 14 may be of any suitable material that is impervious to the passage of air or gas through the walls thereof. Preferably pipe 14 should be of a size which is sufficient to take the maximum flow of air at any given time without unduly stressing the bag.

In Figs. 4 and 5 a modification of the expansion chamber above described, is shown. According to this form of the invention, the expansion chamber is in the form of a large bag 16 provided with a constricted throat. Bag 16 may be constructed from any flexible material which is made impervious to the passage of air or gas through the material. The outer end of the throat of the bag 16 is attached to a suitable connection 17 which extends through the cover 3 to the outside atmosphere.

The opening in cover 3 through which passes connection 17, is made airtight, and a weatherproof vent 18 may be disposed over the outer end of the opening for protection from the elements.

Fig. 6 illustrates another embodiment of the invention wherein a plurality of bags 19 are employed. In the construction shown the neck of each bag 19 is connected to a central pipe 20 which extends out of the silo through cover 3. Other constructions where a plurality of bags are employed may be resorted to.

Referring now to the first embodiment of the invention as illustrative, after the silo is initially filled with green forage which is to be converted into silage, the expansion chamber or bag 10 will be disposed at one end of the support 13 in a deflated condition or it may be lying deflated on the top of the forage. Air may continue to flow into chamber 10 through pipe 14 until fermentation begins and gases developed build up pressure on the inside of the silo. The greater amount of the free oxygen within the silo is quickly absorbed by the plant cells of the green forage. As fermentation continues, considerable quantities of carbon dioxide are generated and has the effect of purging out any air not absorbed by the plant cells which might promote mold growth. Any pressure from the gases of fermentation, in excess of atmospheric due to breathing or other causes will force the air in expansion chamber 10 out through the passage of pipe 14 to the outside atmosphere tending to equalize the pressure inside of the silo with that outside of the silo.

During the nighttime hours the temperature of the atmosphere generally drops. The lower temperature cools the gases inside the silo and this cooling causes the silo gases to contract. Likewise, when the temperature of the atmosphere rises, as for example during daytime hours, the gas inside the silo will tend to expand. It is at these times that the structure will inhale and exhale and the expansion chamber functions to take in air or to release the same to compensate for the expansion or contraction of the gases inside the silo.

The volume of silage withdrawn from day to day must be replaced by gases. This is accomplished in two ways: (1) initially by the inflation and expansion of chamber 10 and the air leakage into the silo through the silage discharge opening; and (2) by slow and continuous respiration of the silage cells utilizing oxygen and forming $CO_2$.

The double acting pressure relief valve 21 is secured to the silo to permit egress of gases from the silo or ingress of air into the silo should pressures therein become in excess, either negative or positive relative to atmospheric, of the predetermined pressures the structure will stand without failure.

The relief valve 21 is shown as having the structure set forth in applicant's Patent No. 2,520,771 granted August 29, 1950, on an application copending herewith. The valve may have any suitable construction, and should be set to protect the bag 10 against rupture from pressure differentials.

When the bag 10 is collapsed, as by an expansion or increase of gases in the silo, the outlet through tube 14 is sufficient small to prevent any large surface area of the bag being subjected to an excessive pressure that might rupture the same before action of the relief valve 21. When the bag 10 is expanded to its full capacity, the relief valve 21 functions to limit the pressure differential acting thereon, by supplying air to the silo external to the bag.

Rectangular shaped bag 10, bag 16 and the bags 19 may be assembled in the silo after filling through opening 8 in cover 3. The bags will initially lie on the top of the stored silage or other forage crop. The operation of bag 16 and bags 19 with changing pressures in the silo corresponds to that of bag or expansion member 10 and need not be separately described.

The bag or bags employed under the several embodiments of the invention are of a size to continue to expand as the level of the stored material drops in the storage structure upon bottom removal of the same from the structure so that the empty space developed within the structure by the bottom unloading of the stored material will be substantially filled by the expansion of the bag or bags.

The weight of the bag has a tendency to collapse the bag and generally results in a requirement that the gas pressure within the silo be a little less than the atmospheric pressure outside the silo in order to inflate the bag. When the gas pressure inside the silo is equal to the outside atmospheric pressure, as when the bottom unloading door is left open or leaks a substantial amount of air, there is a tendency for the bag to collapse slowly from its own weight. For this reason the discharge door should be closed promtly after an unloading operation.

An expansion chamber consisting of a bag or plurality of bags as described offers an economical construction for sealing off air from a storage structure or for retaining gases within a storage structure given off by the stored material and yet which compensates for pressure changes within the structure where the gases tend to flow off or air to flow in under normal operating conditions.

The bottom unloading of the structure also makes feasible the employment of the expansion bag or chamber to obtain the airtight storage desired.

The structure described above may be employed advantageously for the storage of other materials than silage, as in the storage of grains. When storing rice, the structure maintains the desired high moisture content. When storing corn or other grains the structure maintains the desired low moisture content. The storage of materials is maintained independent of normal atmospheric humidity conditions.

Various embodiments of the invention may be employed within the scope of the accompanying claim.

I claim:

A storage structure for materials of a type which deteriorate in contact with excessive amounts of air, which comprises a container of substantial capacity for storing said materials and sealed against the entry of air and escape of gases, a foundation supporting the container at the bottom, a supporting member extending transversely of the container adjacent the upper end thereof, an impervious bag suspended within the container from said support and free to slide along said support upon contraction or expansion of the same, and a connection extending through the upper wall of the container from the bag to the outside of the structure for air to flow therethrough into and out of the bag upon expansion and contraction of the gases inside the structure due to changing temperature and barometric conditions and the respiratory action of the materials, and an unloader disposed in the bottom of the container to unload materials from the container through a sealed opening in the lower portion thereof without disturbing the operation of said bag in protecting the structure against rupture and the materials therein against spoilage.

WESLEY G. MARTIN.

References Cited in the file of this patent

UNITED STATES PATENTS

| Number | Name | Date |
|---|---|---|
| 1,275,558 | Hohngreen | Aug. 13, 1918 |
| 1,690,072 | Johnson | Oct. 30, 1928 |
| 1,695,076 | Zohe | Dec. 11, 1928 |
| 2,040,798 | Schoonmaker | May 12, 1936 |
| 2,286,797 | Duerme | June 16, 1942 |
| 2,305,423 | Heuser | Dec. 5, 1942 |
| 2,551,217 | Martin | May 1, 1951 |

FOREIGN PATENTS

| Number | Country | Date |
|---|---|---|
| 10,419 | Great Britain | Dec. 7, 1844 |